United States Patent [19]
Flitter et al.

[11] Patent Number: 5,375,905
[45] Date of Patent: Dec. 27, 1994

[54] PORTABLE GROUND PLATFORM SEAT

[76] Inventors: Donald E. Flitter; Judy Flitter, both of 142A E. Washington St., West Bend, Wis. 53095

[21] Appl. No.: 110,508

[22] Filed: Aug. 23, 1993

[51] Int. Cl.⁵ .......................... A47C 4/08; A47C 7/62
[52] U.S. Cl. ...................................... 297/15; 297/17; 297/217; 43/54.1
[58] Field of Search ................... 297/15, 17, 188, 217; 43/21.2, 54.1; 108/18, 99; 248/188.5

[56] References Cited

U.S. PATENT DOCUMENTS

| | | | |
|---|---|---|---|
| 4,216,933 | 8/1980 | Cramer | 248/188.5 |
| 4,550,835 | 11/1985 | Lynch | 248/188.5 X |
| 5,107,775 | 4/1992 | Longlais et al. | 248/188.5 X |
| 5,228,227 | 7/1993 | Hodgson, Sr. | 297/15 X |

FOREIGN PATENT DOCUMENTS 7326  3/1909  United Kingdom ................. 297/15

Primary Examiner—Peter R. Crown
Attorney, Agent, or Firm—Hugh E. Smith

[57] ABSTRACT

A portable ground platform seat for supporting a user above a ground surface. The apparatus includes a platform member supported upon a plurality of adjustable pedestals that provides an area upon which a hunter or the like may quietly move upon and further provides an insulating barrier between the hunter and a frozen ground surface. A folding seat assembly is pivotally secured to the platform member and may be erected to provide seating for the user. In addition, the platform seat further includes a plurality of platform cavities into which a plurality of support posts may be positioned that are each operable to support a rifle, a fishing pole, or the like. The apparatus is constructed of a foam core covered by a rugged exterior skin to provide a lightweight assembly which may be easily carried by the user.

5 Claims, 3 Drawing Sheets

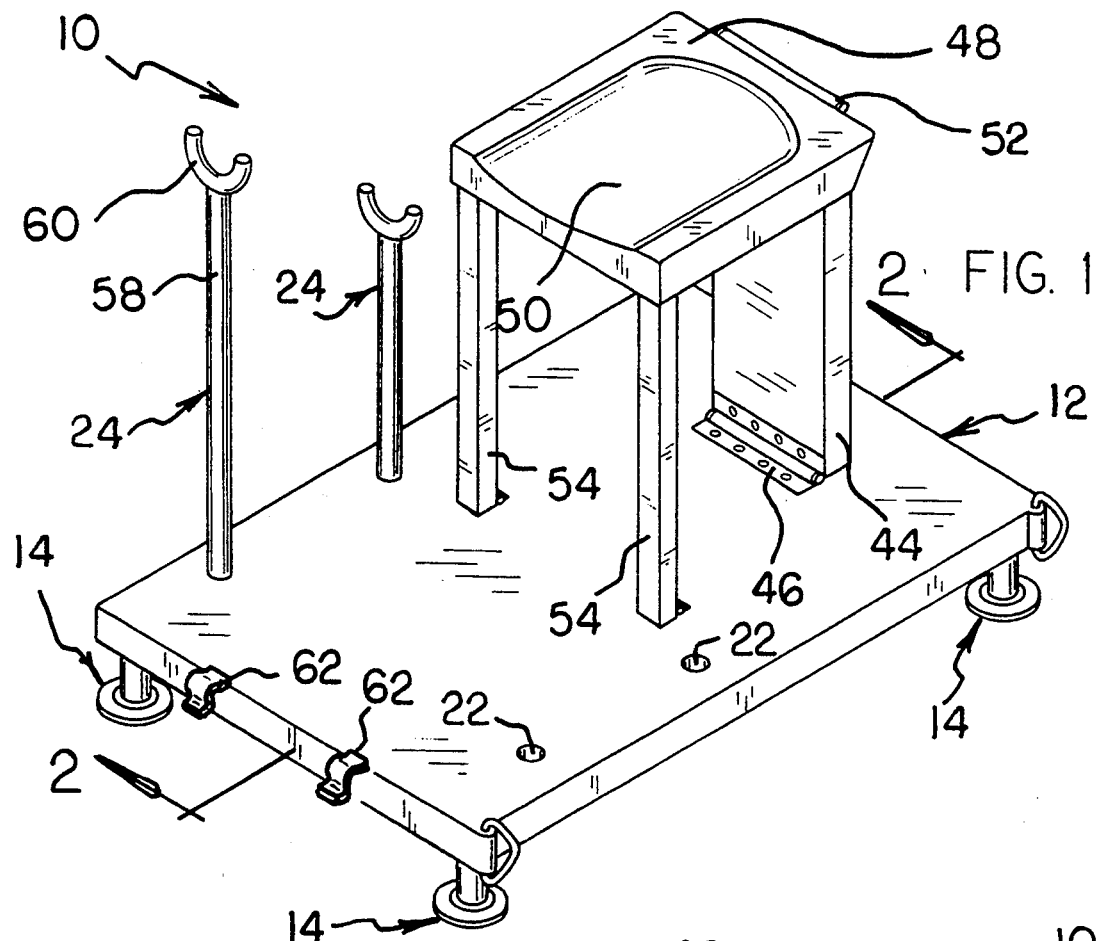
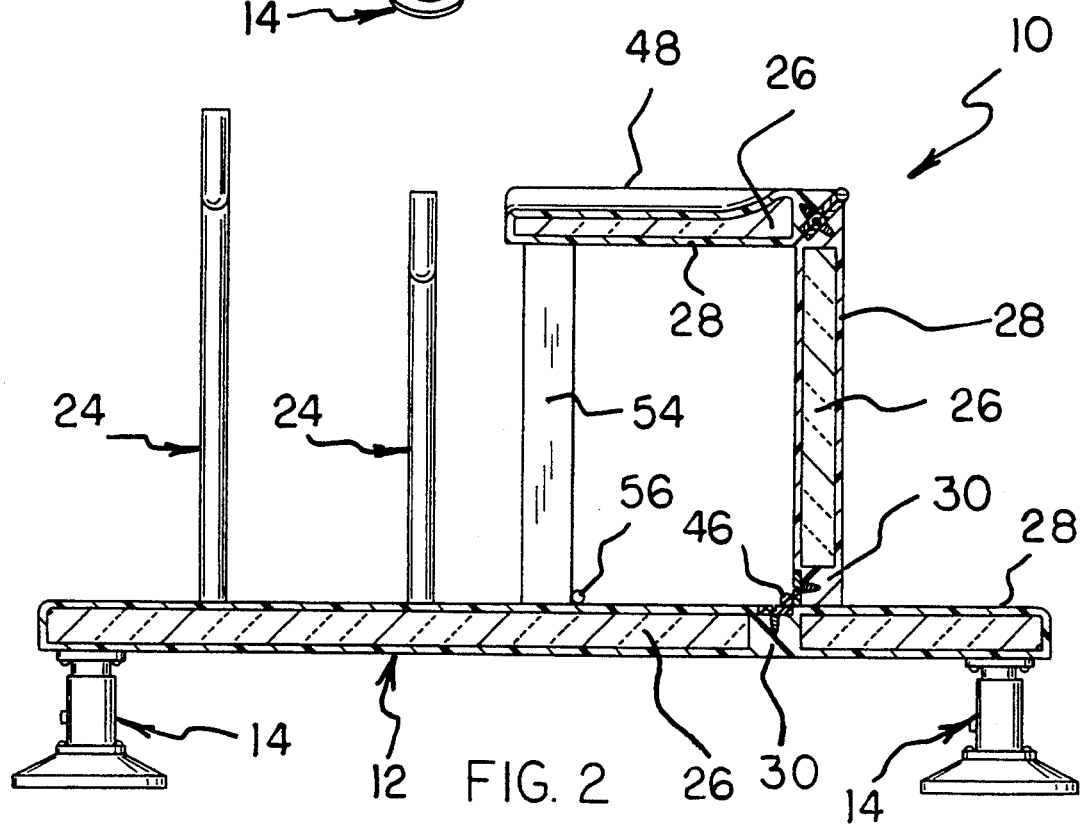

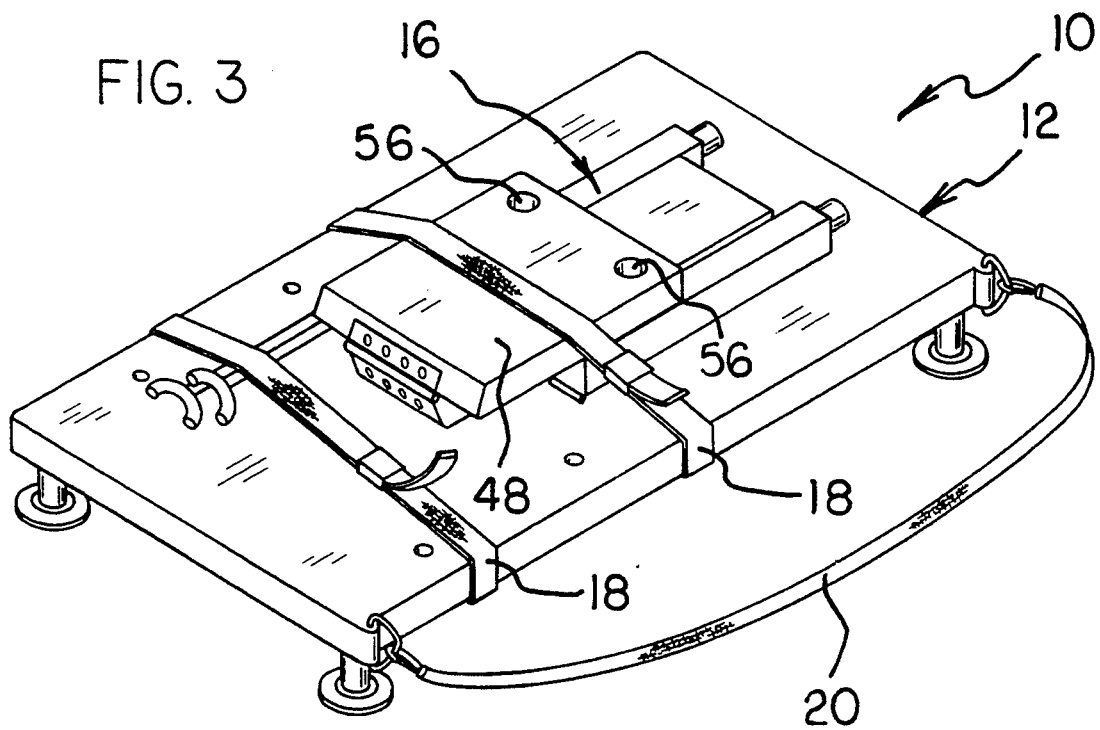
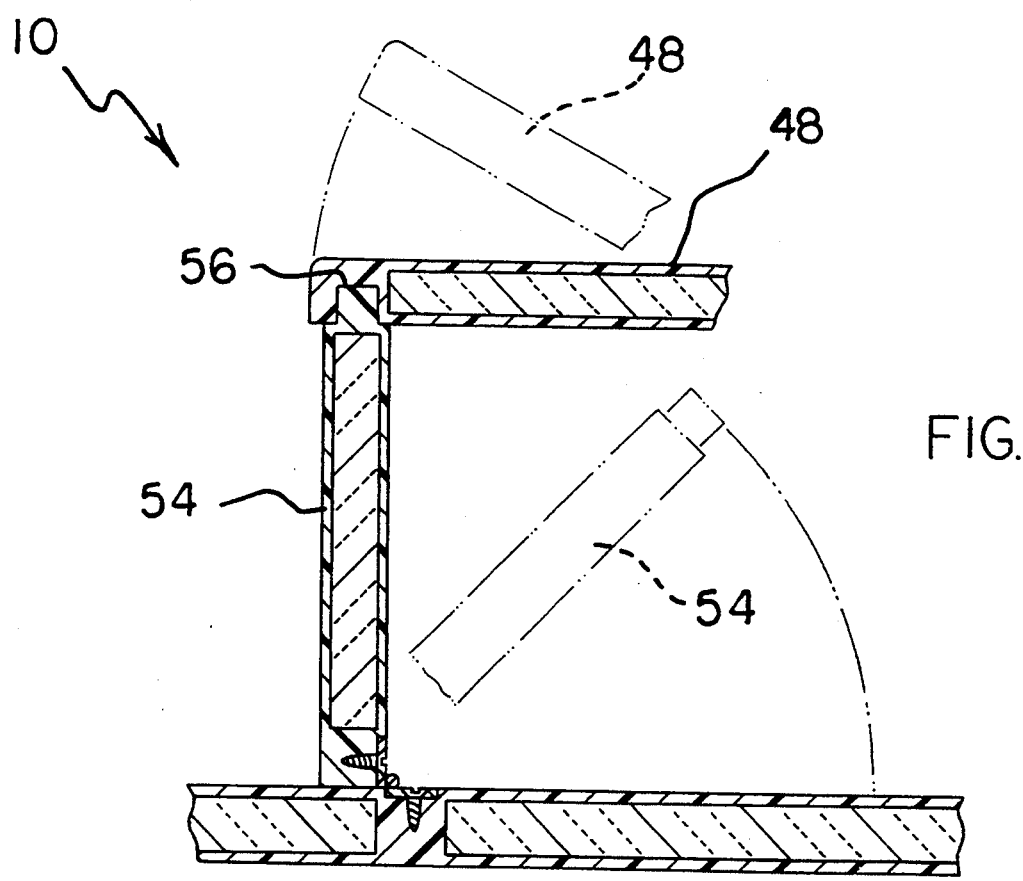

PORTABLE GROUND PLATFORM SEAT

BACKGROUND OF THE INVENTION

1. Field of the Invention

The present invention relates to seats and more particularly pertains to a portable ground platform seat which may be utilized for supporting a user above a ground surface.

2. Description of the Prior Art

The use of seats is known in the prior art. More specifically, seats heretofore devised and utilized for the purpose of supporting a user in a hunting environment are known to consist basically of familiar, expected and obvious structural configurations, notwithstanding the myriad of designs encompassed by the crowded prior art which have been developed for the fulfillment of countless objectives and requirements.

For example, a hunting stand system is illustrated in U.S. Pat. No. 5,009,283 which may be supported by a tree, a ladder, or a tripod. The stand has a collapsible seat assembly which serves as a foot bar when used as a climbing stand and further has adjustable arms which may be used as a component of the climbing bar assembly. The hunting stand may be supported at its back end by engagement with a tree, or alternatively, tripod legs may be inserted into sockets in the stand to provide support thereof.

A hunting stand is disclosed in U.S. Pat. No. 4,951,696 which may be utilized to provide an elevated hunting station for rifle and bow hunters. The stand is operable to be releasably engaged to a tree in a spaced relationship from the ground and includes a ladder for facilitating access to and from the stand.

Another patent of interest is U.S. Pat. No. 4,549,635 which describes a portable folding hunting stand having a rigid U-shaped tubular platform and a rigid elongated tubular seat support member foldably connected thereto. The seat support member and the platform are both provided with tree engaging means which allow the hunting stand to be engaged to a tree and secured thereto by a link chain which encircles the tree. A rope looped around the tree and releasably secured to each platform leg prevents disengagement and increases stability of the stand in the erected position. The rope further provides a shoulder sling for carrying the stand in the collapsed transporting position.

While these devices fulfill their respective, particular objectives and requirements, the aforementioned patents do not disclose a portable ground platform seat for supporting a user above a ground surface which includes a platform member supported upon a plurality of adjustable pedestals that provides an area upon which a hunter or the like may quietly move upon and further provides an insulating barrier between the hunter and a frozen ground surface. In addition, none of the known prior art seats discloses an apparatus constructed of a foam core covered by a rugged exterior skin to provide a light weight assembly which may be easily carried by a user.

In these respects, the portable ground platform seat according to the present invention substantially departs from the conventional concepts and designs of the prior art, and in so doing provides an apparatus primarily developed for the purpose of providing an area upon which a hunter or the like may quietly move upon and further providing an insulating barrier between the hunter and a frozen ground surface.

SUMMARY OF THE INVENTION

In view of the foregoing disadvantages inherent in the known types of seats now present in the prior art, the present invention provides a new portable ground platform seat construction wherein the same can be utilized for supporting a user above a ground surface and providing an insulating barrier between the user and a frozen ground surface. As such, the general purpose of the present invention, which will be described subsequently in greater detail, is to provide a new portable ground platform seat apparatus which has many of the advantages of the seats mentioned heretofore and many novel features that result in a portable ground platform seat which is not anticipated, rendered obvious, suggested, or even implied by any of the prior art seats, either alone or in any combination thereof.

To attain this, the present invention essentially comprises a portable ground platform seat for supporting a user above a ground surface. The apparatus includes a platform member supported upon a plurality of adjustable pedestals that provides an area upon which a hunter or the like may quietly move upon and further provides an insulating barrier between the hunter and a frozen ground surface. A folding seat assembly is pivotally secured to the platform member and may be erected to provide seating for the user. In addition, the platform seat further includes a plurality of platform cavities into which a plurality of support posts may be positioned that are each operable to support a rifle, a fishing pole, or the like. The apparatus is constructed of a foam core covered by a rugged exterior skin to provide a light weight assembly which may be easily carried by the user.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new portable ground platform seat apparatus which has many of the advantages of the seats mentioned heretofore and many novel features that result in a portable ground platform seat which is not anticipated, rendered obvious, suggested, or even implied by any of the prior art seats, either alone or in any combination thereof.

It is another object of the present invention to provide a new portable ground platform seat which may be easily and efficiently manufactured and marketed.

It is a further object of the present invention to provide a new portable ground platform seat which is of a durable and reliable construction.

An even further object of the present invention is to provide a new portable ground platform seat which is susceptible of a low cost of manufacture with regard to both materials and labor, and which accordingly is then susceptible of low prices of sale to the consuming public, thereby making such portable ground platform seats economically available to the buying public.

Still yet another object of the present invention is to provide a new portable ground platform seat which provides in the apparatuses and methods of the prior art some of the advantages thereof, while simultaneously overcoming some of the disadvantages normally associated therewith.

Still another object of the present invention is to provide a new portable ground platform seat for supporting a user above a ground surface which includes a platform member supported upon a plurality of adjustable pedestals.

Yet another object of the present invention is to provide a new portable ground platform seat which provides an area upon which a hunter or the like may quietly move upon and further provides an insulating barrier between the hunter and a frozen ground surface.

Even still another object of the present invention is to provide a new portable ground platform seat that includes a plurality of platform cavities into which a plurality of support posts may be positioned, each being operable to support a rifle, a fishing pole, or the like in a desired position.

Even still yet another object of the present invention is to provide a new portable ground platform seat constructed of an inner core covered by a rugged exterior skin to provide a light-weight assembly which may be easily carried by a user.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of a portable ground platform seat comprising the present invention.

FIG. 2 is a cross sectional view taken along line 2—2 of FIG. 1

FIG. 3 is a perspective view of the present invention in a compacted position.

FIG. 4 is an enlarged cross sectional view of a portion of the invention.

DESCRIPTION OF THE PREFERRED EMBODIMENT

Figure 5:
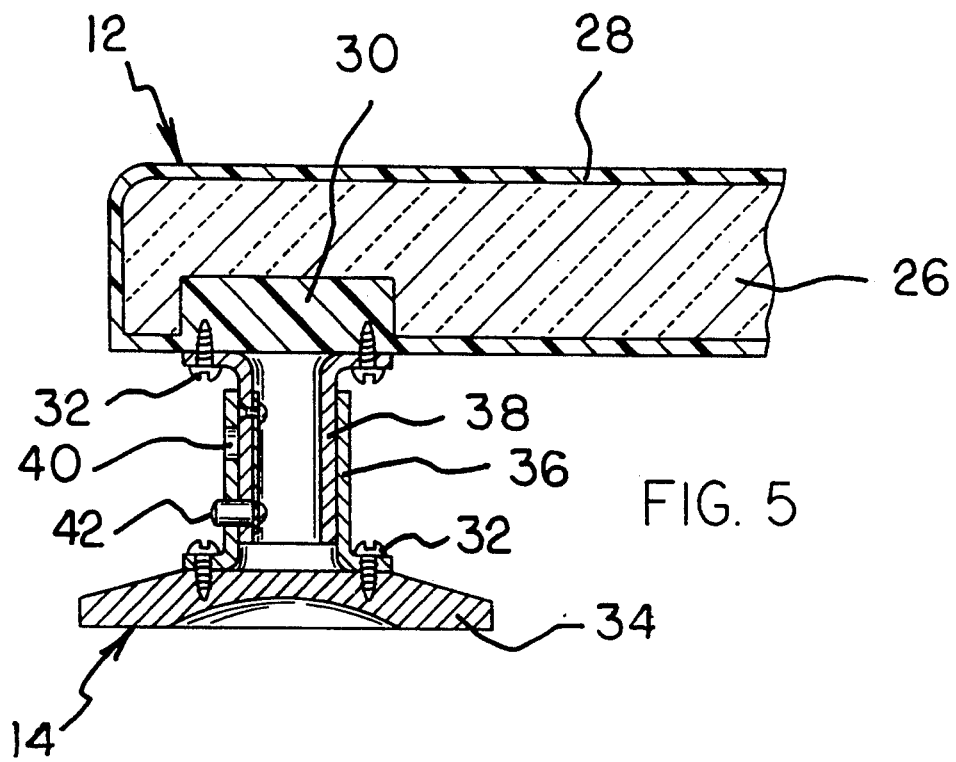
FIG. 5 is a further enlarged cross sectional view of a further portion of the invention detailing a pedestal thereof.

With reference now to the drawings, and in particular to FIGS. 1-6 thereof, a new portable ground platform seat embodying the principles and concepts of the present invention and generally designated by the reference numeral 10 will be described.

The portable ground platform seat 10 comprises a substantially rectangular platform member 12 having a pedestal 14 at each corner thereof. Each of the pedestals 14 is telescopically adjustable and is operable to support the platform member 12 in a spaced relationship to a ground surface. The platform member 12 is operable to provide an area upon which a user may quietly move without disturbing leaves, brush, and other debris therebeneath which would create noise and thus scare away huntable game. The platform member 12 also serves as an insulating barrier between the user and the ground surface to preclude heat exchange therebetween.

A seat assembly 16 is pivotally coupled to the platform member 12 and may be erected by the user to form a seating area upon which the user may sit. The seat assembly 16 may be folded compactly against the platform member 12 and secured in the compacted position by securing straps 18, as best illustrated in FIG. 3, so that the device 10 may be easily carried through a conventional use of a carrying strap 20 coupled thereto.

In addition, the platform member 12 is provided with a plurality of platform cavities 22 which are each operable to retain and support in an upright position a support post 24. A plurality of support posts 24 may be provided, and each of these support posts may be utilized for supporting a hunting implement such as a rifle, a fishing pole, or the like in a desired position.

More specifically, it will be noted that the portable ground platform seat 10 comprises a platform member 12 having a substantially rectangular shape comprised of an inner core 26 surrounded by a rugged exterior skin 28. The inner core 26 may be formed of any substantially light weight, insulative material such as a foam or a honeycomb structure. The exterior skin 28 which encapsulates the inner core 26 may be formed of any substantially rigid material such as a plastic, a composite laminate, or the like. Suitable composite laminates include carbon fiber and matrix composites, and more conventional composite structures such as fiberglass. In the preferred embodiment, the platform member 12 comprises an inner core 26 of foam and an exterior skin 28 of a lightweight, rigid plastic such that the entire portable ground platform seat 10 may be easily carried by the user. To provide additional strength, reinforced areas 30 of substantially solid material are provided throughout the platform seat 10 in areas where fasteners and the like engage.

The platform member 12 is supported in a spaced relationship to the ground surface by a plurality of pedestals 14. Each of the pedestals 14 is located at a corner of the platform member 12 and is secured thereto by conventional fasteners 32, as best illustrated in FIG. 5. With continuing reference to FIG. 5, it can be seen that each of the pedestals 14 comprises a base 34 having a substantially circular shape. A lower tube 36 is fixedly secured to the base 34 by similar conventional fasteners 32 and is operable to slidably receive an upper tube 38 therewithin. The lower tube 36 includes at least one position aperture 40 through which a button 42 may project. The button 42 is pivotally and resiliently coupled to the upper tube 38 by an unlabeled spring such that the button 42 is biased into one of the at least one position apertures 40. By this structure, the lower tube 36 may be selectively positioned with respect to the upper tube 38 and secured in such a position through an engagement of the button 42 and one of the at least one position apertures 40. Each of the pedestals 14 may be individually adjusted to conform to the topography of rough or uneven terrain. This allows a user to position the platform member 12 in a level manner.

Pivotally connected to the platform member 12 is a seat assembly 16 which may be erected to form a seating area for the user. As best illustrated in FIGS. 1 and 2, the seat assembly 16 comprises a seat support 44 which is pivotally connected at a first end thereof to the platform member 12 by a seat support hinge 46 that allows the seat support to be positioned in either a parallel or orthogonal relationship to the platform member. A seat 48 having a contoured area 50 thereon is pivotally coupled to a second end of the seat support 44 by a seat hinge 52 which allows the seat to be positioned either parallel or orthogonal to the seat support 44. Both the seat support 44 and the seat 48 are constructed in a similar manner as the platform member 12 to include an inner core 26 covered by an exterior skin 28. This provides the seat assembly 16 with the light weight, insulative properties as is also provided by the platform member 12.

The seat 48 is further supported by a pair of seat posts 54 which are pivotally connected to the platform member 12 by a pair of seat post hinges 56 such that each of the seat posts 54 may be positioned either parallel or orthogonal to the platform member 12. As best illustrated in FIGS. 3–4, the seat 48 includes a pair of seat cavities 56 on a bottom surface thereof which are each operable to receive a portion of the seat post 54 to retain the same in an upright position when the seat assembly 16 is erected. The seat assembly 16 provides a comfortable area upon which the user may sit while utilizing the portable ground platform seat 10.

The seat assembly 16 may be compactly stored against the platform member 12 for transportation, as best illustrated in FIG. 3. FIG. 4 diagrams a motion of the seat assembly 16 as it is being compacted. To compact the seat assembly 16, the user simply lifts the seat 48 upward to release the seat posts 54 from the seat cavities 56, whereby the seat posts 54 may then be positioned parallel to the platform member 12. The seat 48 may then pivoted three quarters of a turn into a parallel relationship with the seat support 44, whereby the seat support may then be pivoted into a parallel relationship with the platform member 12 to define the compacted position as illustrated in FIG. 3. A pair of securing straps 18 is provided to secure the seat assembly 16 against the platform member 12 in a well understood manner. The seat assembly 16 may be erected by simply reversing the aforementioned collapsing procedure.

As mentioned above, the platform member 12 includes the plurality of platform cavities 22 which are each operable to engage and retain a support post 24 in an orthogonal relationship to the platform member. Each of the support posts 24 comprises a pole member 58 formed from a substantially lightweight, possibly hollow, tubular member. A U-shaped support 60 is integrally or otherwise formed upon a top area of the pole member 58 and is operable to support a hunting implement such as a rifle, a fishing pole, or the like thereon. The preferred embodiment of the instant invention includes a plurality of support posts of various heights as shown best in FIG. 2. By this structure, the user may position the rifle, fishing pole, or the like at various angles. When not in use, the support posts may be stored against the platform member 12 through a well understood engagement to a pair of post clips 62 located on a side thereof.

Figure 6:
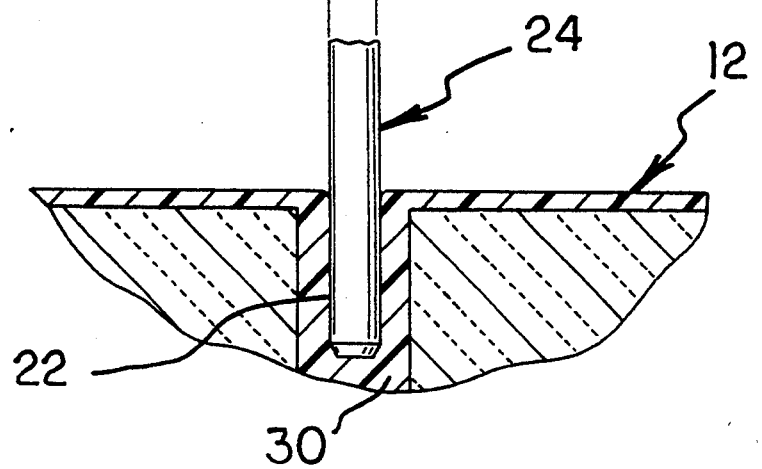
FIG. 6 is a front elevation view, partially in cross section, of an even further portion of the invention.

FIG. 6 details an alternate form of the support post 24 which may be utilized in conjunction with the platform member 12 as described above. The support post 24 illustrated in this Figure comprises the same pole member 58 having a multi-position support 64 fixedly secured to a top area thereof. The multi-position support 64 performs a similar function as the U-shaped support 60, but it includes a plurality of grooves 66 which allows for various lateral adjustments of the hunting implements supported thereon.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A portable ground platform seat comprising:
   a substantially rectangular platform member having four corners;
   pedestal means secured to each of said plurality of corners for supporting said platform member in a spaced relationship relative to a ground surface, said pedestal means comprising a base, a lower tube fixedly secured to said base, said lower tube having a plurality of position apertures extending from an exterior of said lower tube through to an interior thereof, an upper tube slidably disposed partially in said lower tube and secured to said platform member, and a button resiliently coupled to said upper tube and operable to engage an individual one of said position apertures to secure a position of said lower tube with respect to said upper tube;

a collapsible seat assembly pivotally coupled to said platform member, said seat assembly comprising a seat support having a lower end and an upper end, said seat support being pivotally coupled at said lower end thereof to said platform member, a seat pivotally coupled to said upper end of said seat support, said seat having a pair of seat cavities extending thereinto, and a pair of seat posts pivotally coupled to said platform member, said seat posts each being positionable at least partially within an individual one of said seat cavities to releasably couple said seat posts to said seat to support said seat in a parallel relationship relative to said platform member, whereby said seat posts are disengageable from said seat to permit folding of said seat posts, said seat, and said seat support member into a substantially parallel position relative to said platform member;

at least one platform cavity extending partially into said platform member;

and;

at least one support post releasably engaged to said at least one platform cavity.

2. The portable ground platform seat of claim 1, wherein said platform member is comprised of an inner core encapsulated by an exterior skin.

3. The portable ground platform seat of claim 2, wherein said seat support, said seat, and said pair of seat posts are comprised of an inner core encapsulated by an exterior skin.

4. The portable ground platform seat of claim 3, wherein said at least one support post comprises a substantially U-shaped member fixedly secured to a substantially straight pole member.

5. The portable ground platform seat of claim 3, wherein said at least one support post comprises a multi-position support fixedly secured to a substantially straight pole member.

* * * * *